(12) United States Patent
Dry et al.

(10) Patent No.: US 10,850,699 B2
(45) Date of Patent: Dec. 1, 2020

(54) SEAT AIRBAG

(71) Applicant: Ford Global Technologies, LLC, Dearborn, MI (US)

(72) Inventors: Alan George Dry, Grosse Pointe Woods, MI (US); Srinivasan Sundararajan, Ann Arbor, MI (US); Johnathan Andrew Line, Northville, MI (US); Brian Robert Spahn, Plymouth, MI (US); Benjamin Yilma, Canton, MI (US); Derek Board, Ferndale, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 16/013,375

(22) Filed: Jun. 20, 2018

(65) Prior Publication Data

US 2019/0389420 A1 Dec. 26, 2019

(51) Int. Cl.

| B60R 21/2338 | (2011.01) |
| B60R 21/207 | (2006.01) |
| B60R 21/231 | (2011.01) |
| B60R 21/16 | (2006.01) |
| B60R 21/00 | (2006.01) |

(52) U.S. Cl.
CPC ........ *B60R 21/2338* (2013.01); *B60R 21/207* (2013.01); *B60R 21/231* (2013.01); *B60R 21/23138* (2013.01); *B60R 2021/0032* (2013.01); *B60R 2021/161* (2013.01); *B60R 2021/23107* (2013.01); *B60R 2021/23146* (2013.01); *B60R 2021/23386* (2013.01)

(58) Field of Classification Search
CPC .............. B60R 21/2338; B60R 21/207; B60R 2021/23146; B60R 2021/23107; B60R 21/231; B60R 21/2334
See application file for complete search history.

(56) References Cited

U.S. PATENT DOCUMENTS

| 6,572,137 | B2 | 6/2003 | Bossecker et al. |
| 7,946,613 | B2 | 5/2011 | Rose et al. |
| 8,104,563 | B2 * | 1/2012 | Narita ..................... B60R 21/36 180/274 |
| 9,783,155 | B2 | 10/2017 | Kondo et al. |
| 10,112,570 | B2 * | 10/2018 | Barbat ................... B60N 2/143 |
| 10,315,606 | B2 * | 6/2019 | Ohno .................... B60R 21/207 |
| 2013/0015642 | A1 | 1/2013 | Islam et al. |

(Continued)

FOREIGN PATENT DOCUMENTS

| DE | 102009037279 A1 | 2/2011 |
| DE | 102014004185 A1 | 9/2015 |

(Continued)

*Primary Examiner* — Paul N Dickson
*Assistant Examiner* — Joselynn Y Sliteris
(74) *Attorney, Agent, or Firm* — Frank A. MacKenzie; Bejin Bieneman PLC

(57) ABSTRACT

An assembly includes a seatback. The assembly includes a first airbag and a second airbag, each inflatable to an inflated position spaced from each other at the seatback and abutting each other in front of and spaced from the seatback. The assembly includes a sheet extending from the first airbag to the second airbag in front of where the first airbag abuts the second airbag in the inflated positions.

18 Claims, 6 Drawing Sheets

(56) References Cited

U.S. PATENT DOCUMENTS

2017/0057456 A1    3/2017  Ohno et al.
2019/0077359 A1*  3/2019  Kim .................. B60R 21/23138
2019/0092272 A1*  3/2019  Funahashi ............... B60R 21/36

FOREIGN PATENT DOCUMENTS

| DE | 202015005104 U1 | 9/2015 | |
| EP | 3290275 A1 | 3/2018 | |
| WO | WO-2013107951 A1 * | 7/2013 | ............. B60R 21/18 |

* cited by examiner

SEAT AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
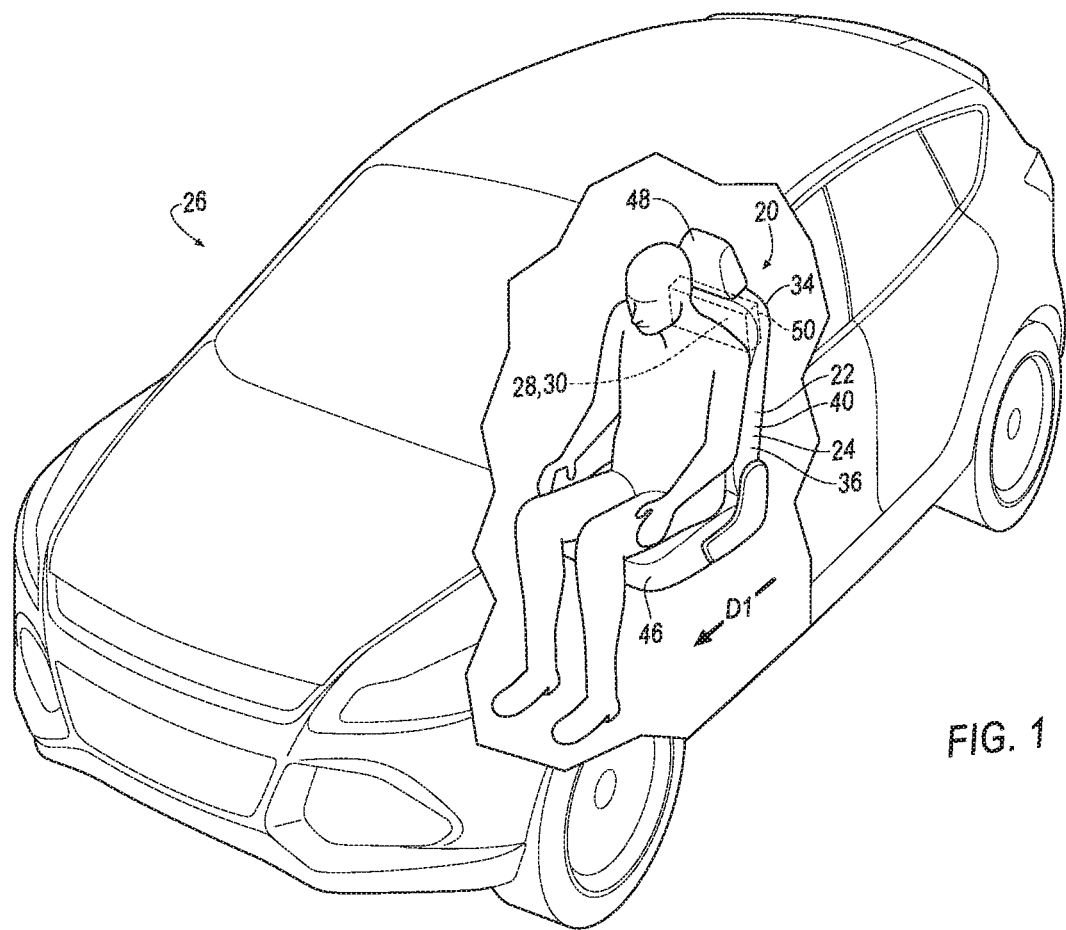
FIG. 1 is a perspective view of a vehicle having a seat with airbags in uninflated positions.
Figure 2:
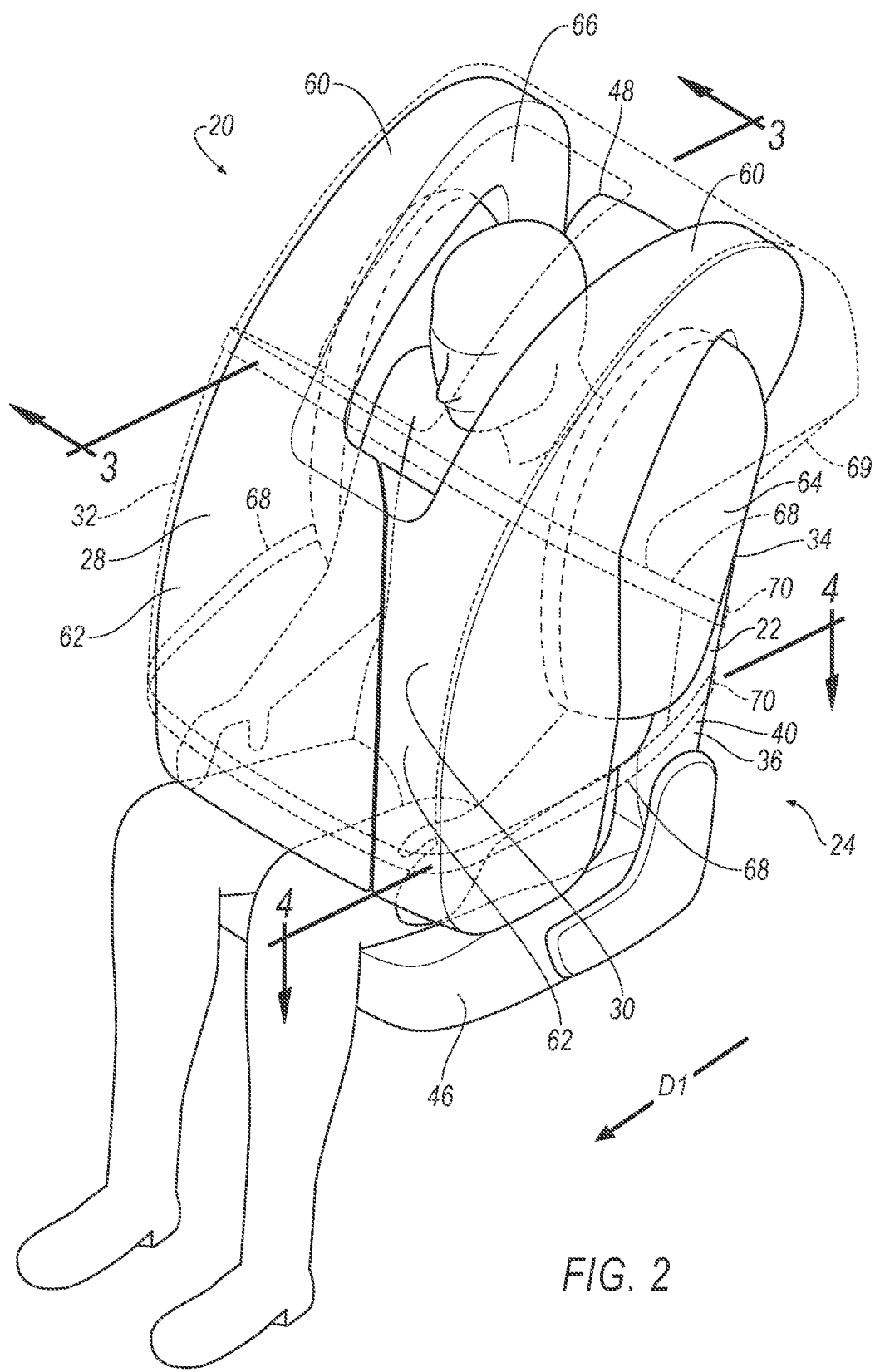
FIG. 2 is a front perspective view of the seat of with the airbags in inflated positions.
Figure 3:
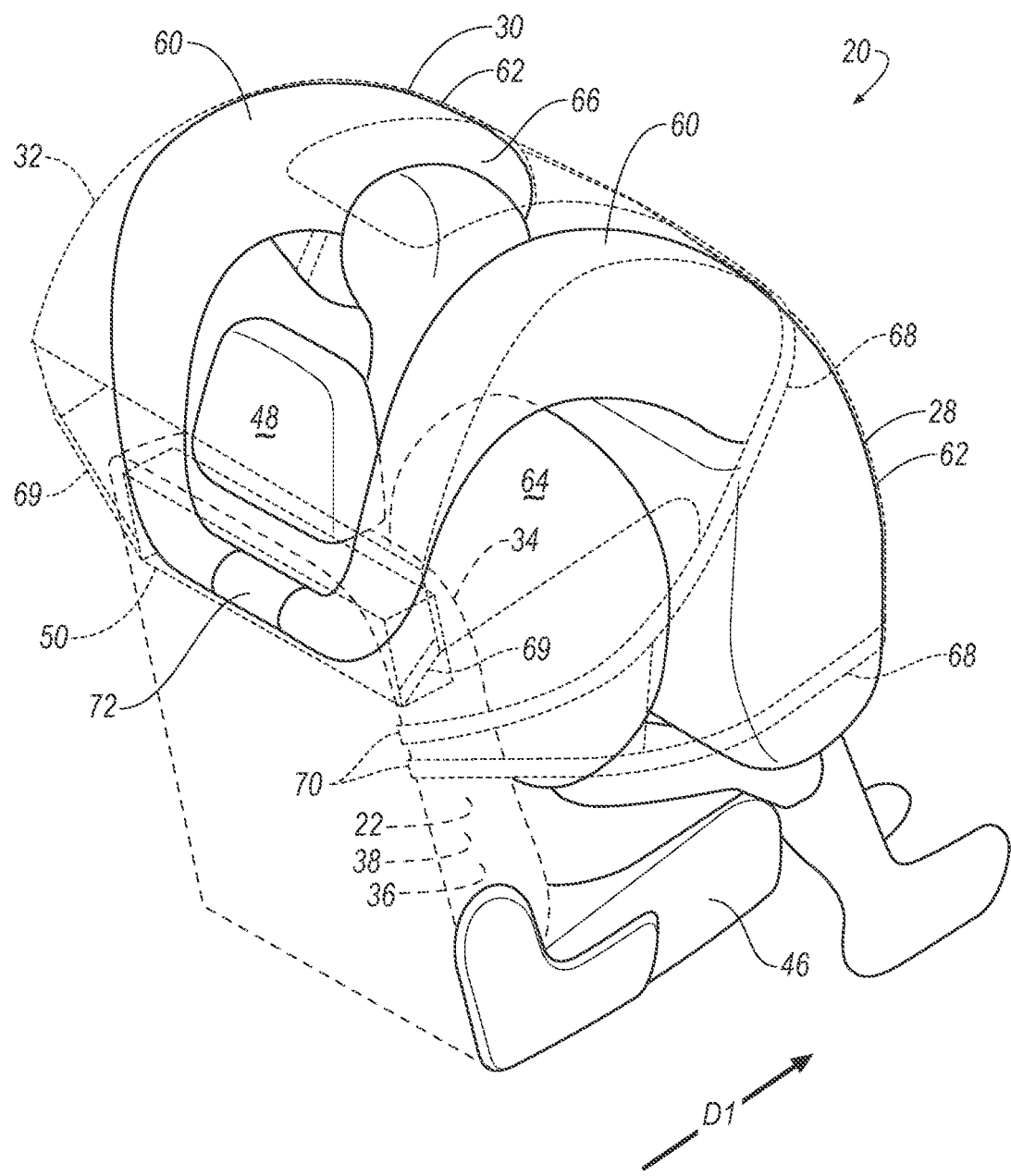
FIG. 3 is a rear perspective view of the seat of with the airbags in the inflated positions.

An assembly includes a seatback. The assembly includes a first airbag and a second airbag, each inflatable to an inflated position spaced from each other at the seatback and abutting each other in front of and spaced from the seatback. The assembly includes a sheet extending from the first airbag to the second airbag in front of where the first airbag abuts the second airbag in the inflated positions.

The first airbag may be in front of the second airbag where the first airbag abuts the second airbag in the inflated positions.

The seatback may have a top, and the first airbag and the second airbag may be supported at the top of the seatback.

The assembly may include a tether fixed to the seatback and extending to the sheet.

The assembly may include a second tether fixed to the seatback and extending to the sheet, the second tether below the tether.

The tether may be fixed to the sheet.

The tether may be free of being directly fixed to the first airbag and may be free of being fixed to the second airbag.

The seatback may include a first side and a second side opposite the first side, the tether may extend from the first side of the seatback along the sheet to the second side of the seatback.

The first airbag and the second airbag may abut each other at a centerline defined by the seatback.

The first airbag and the second airbag in the inflated positions may each include a top portion and a front portion, the top portions extending arcuately from the seatback to the front portions and spaced from each other, the front portions extending toward and abutting each other.

The front portions may be thicker than the top portions.

The sheet may extend along the top portions and the front portions of the first airbag and the second airbag.

The sheet may extend away from one of the front portions and toward the seatback.

The assembly may include a side airbag supported by the seatback and inflatable to an inflated position between the seatback and the first airbag in the inflated position.

The assembly may include a processor and a memory storing instructions executable by the processor to inflate the first airbag, and then inflate the side airbag.

The sheet may define an opening between the first airbag and the second airbag in the inflated positions.

The opening may be in front of and above the seatback.

The first airbag and the sheet may be a same type of material.

The sheet may be uninflatable.

The assembly may include an inflator in fluid communication with the first airbag and the second airbag.

With reference to the Figures, wherein like numerals indicate like parts throughout the several views, an airbag assembly 20 for a seatback 22 of a seat 24 of a vehicle 26 includes a first airbag 28 and a second airbag 30, each inflatable to an inflated position. The adjectives "first" and "second" are used throughout this document as identifiers and are not intended to signify importance or order. The first airbag 28 and the second airbag 30 in the respective inflated positions are spaced from each other at the seatback 22, and abut each other in front of and spaced from the seatback 22. The airbag assembly 20 includes a sheet 32 extending from the first airbag 28 to the second airbag 30 in front of where the first airbag 28 abuts the second airbag 30 in the respective inflated positions.

The arrangement of the first airbag 28, the second airbag 30, and the sheet 32 enable the first airbag 28 and the second airbag 30 to inflate from an uninflated position to the inflated position without interference from an occupant of the seat 24. For example, the first airbag 28 and the second airbag 30 may travel over a head of the occupant as the first airbag 28 and the second airbag 30 inflate. As the first airbag 28 and the second airbag 30 inflate, the sheet 32 aids in positioning the first airbag 28 and the second airbag 30 in front of the occupant. The sheet 32 further aids in maintaining the position of the first airbag 28 and the second airbag 30 in the inflated positions to control kinematics of the occupant.

The vehicle 26 may be any passenger or commercial automobile such as a car, a truck, a sport utility vehicle, a crossover vehicle, a van, a minivan, a taxi, a bus, etc.

The vehicle 26 includes one or more seats 24. Each of the seats 24 is shown as a bucket seat, but alternatively the seats 24 may be a bench seat or another type of seat 24. The seats 24 may be supported by a floor of the vehicle 26.

The seat 24 includes the seatback 22. The seatback 22 has a top 34. The seatback 22 has a bottom 36 opposite the top 34. The seatback 22 has a first side 38 and a second side 40 opposite the first side 38, e.g., a right side and a left side relative to the occupant of the seat 24. The seatback 22 has a front surface 42 and a rear surface 44 opposite the front surface 42. The occupant may recline against the front surface 42 when occupying the seat 24.

The seat 24 includes a seat bottom 46. The seat bottom 46 may support the seatback 22, e.g., at the bottom 36 of the seatback 22. The seatback 22 may be stationary or movable relative to the seat bottom 46.

The seat 24 includes a head restraint 48. The head restraint 48 may be supported by the seatback 22, e.g., at the top 34 of the seatback 22. For example, the head restraint 48 may be above the top 34 and connected to the seatback 22, e.g., with one or more posts.

The seatback 22 defines a centerline CL. The centerline CL is elongated between the front surface 42 and the rear surface 44 of the seatback 22, and is equidistant between the first side 38 and the second side 40 of the seatback 22.

The seat 24 defines a seat-forward direction D1. The seat-forward direction D1 may be relative to the occupant of the seat 24. For example, the seat bottom 46 may extend from the seatback 22 in the seat-forward direction D1.

The first airbag 28 and the second airbag 30 are supported at the top 34 of the seatback 22, e.g., via a housing 50 (described below). For example, the housing 50 and the airbags 28, 30 in the uninflated positions may be supported within the seatback 22 behind shoulders, a neck, and/or a head of an occupant of the seat 24. As another example, the housing 50 and the airbags 28, 30 in the uninflated positions may be supported within a top quarter of the seatback 22. As yet one more example, the housing 50 and the airbags 28, 30 in the uninflated positions may be supported within the seatback 22 proximate the head restraint 48, e.g., closer to the top 34 than the bottom 36. The first airbag 28 may be supported at the first side 38 of the seatback 22. The second airbag 30 maybe supported at the second side 40 of the seatback 22.

The first airbag 28 and the second airbag 30 are each inflatable from the uninflated position, shown in FIG. 1, to the inflated position, shown in FIGS. 2-5. For example, the first airbag 28 and the second airbag 30 may each include an inner panel 52 and an outer panel 54. The inner panels 52 and the outer panels 54 may define inflation chambers 56 therebetween in the inflated positions. The inner panels 52 may be closer to the seatback 22 than the outer panels 54 when the first airbag 28 and the second airbag 30 are in the inflated positions. The first airbag 28 and the second airbag 30 may each include a connecting panel 58. The connecting panels 58 may extend from the inner panels 52 to the outer panels 54. The connecting panels 58, the inner panels 52, and/or the outer panels 54 may be fixed to each other, e.g., via stitching, adhesive, friction welding, etc. The connecting panels 58, the inner panels 52, and/or the outer panels 54 may be monolithic, i.e., a one-piece construction, e.g., a same sheet of material.

The first airbag 28 and the second airbag 30 in the respective inflated positions are spaced from each other at the seatback 22. For example, the first airbag 28 may be at the first side 38 of the seatback 22 and the second airbag 30 may be at the second side 40 of the seatback 22 with the head restraint 48 therebetween.

The first airbag 28 and the second airbag 30 in the respective inflated positions abut each other in front of and spaced from the seatback 22. For example, the connecting panel 58 of the first airbag 28 may abut the connecting panel 58 of the second airbag 30 spaced from the front surface 42 of the seatback 22 in the seat-forward direction D1. In other words, the connecting panels 58 may abut each other and may be spaced from the front surface 42 of the seatback 22 with the front surface 42 of the seatback 22 between the connecting panels 58 and the rear surface 44 of the seatback 22. The first airbag 28 may be in front of the second airbag 30 where the first airbag 28 abuts the second airbag 30 in the inflated positions, or vice versa. For example, the connecting panel 58 of the second airbag 30 may be between the connecting panel 58 of the first airbag 28 and the seatback 22, or vice versa. The first airbag 28 and the second airbag 30 may abut each other at the centerline CL defined by the seatback 22. For example, the connecting panels 58 may abut each other equidistant between the first side 38 and the second side 40 of the seatback 22 and spaced from the front surface 42 of the seatback 22 in the seat-forward direction D1.

The first airbag 28 and the second airbag 30 in the respective inflated positions may each include a top portion 60. The top portions 60 may extend arcuately from the seatback 22. The top portions 60 may extend from the seatback 22 in the seat-forward direction D1. The top portions 60 may extend to the front portions 62. The top portions 60 may be spaced from each other. For example, the top portion 60 of the first airbag 28 may be at the first side 38 of the seatback 22 and the top portion 60 of the second airbag 30 may be at the second side 40 of the seatback 22 with the head restraint 48 therebetween.

The first airbag 28 and the second airbag 30 in the respective inflated positions may each include a front portion 62. The front portions 62 extend from the top portions 60. The front portions 62 may extend downward, e.g., toward the seat bottom 46. The front portion 62 may extend toward each other, e.g., toward the centerline CL. The front portions 62 may abut each other, e.g., at the connecting panels 58.

Figure 4:
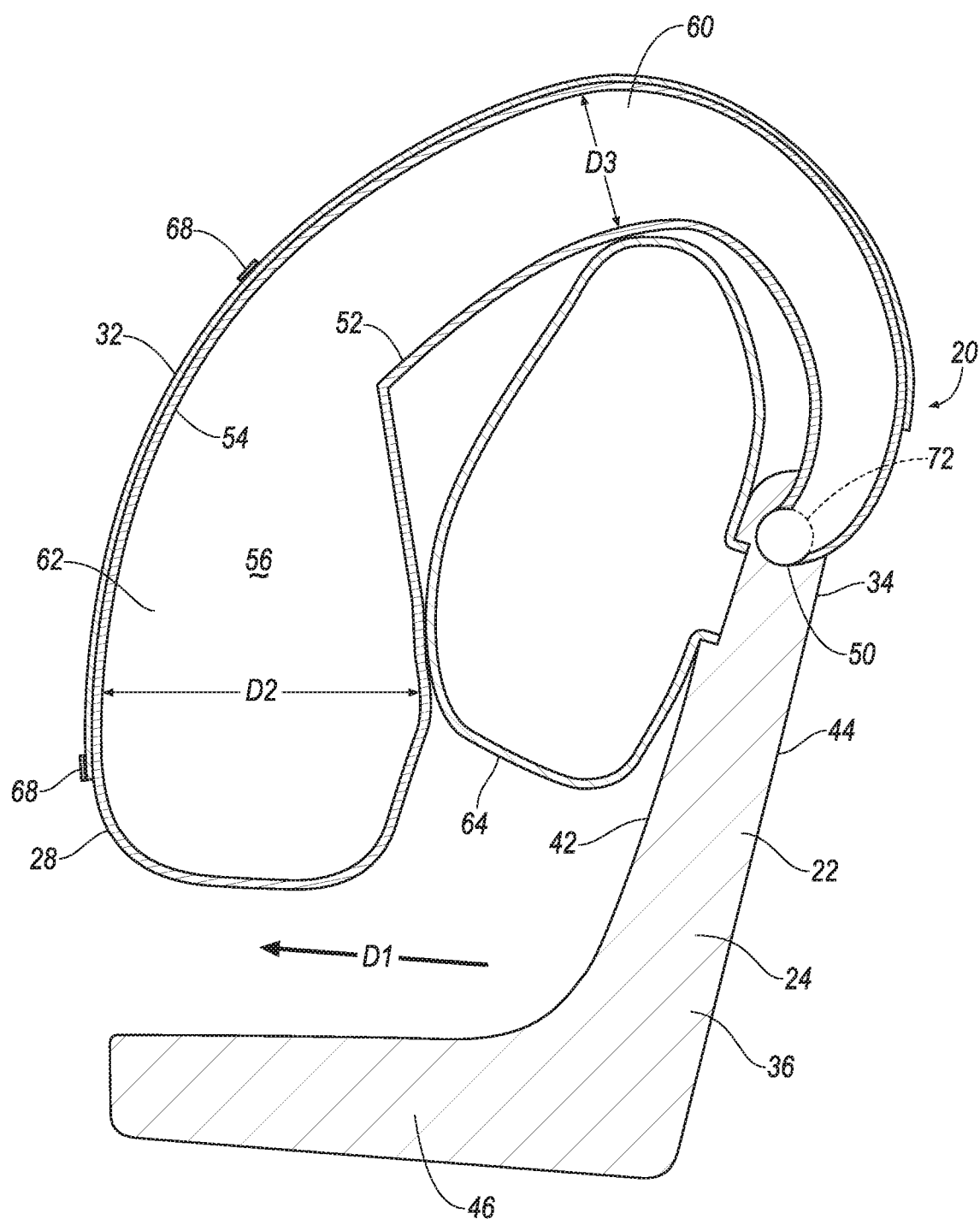
FIG. 4 is a side view cross section of FIG. 2 along the line 3-3.
Figure 5:
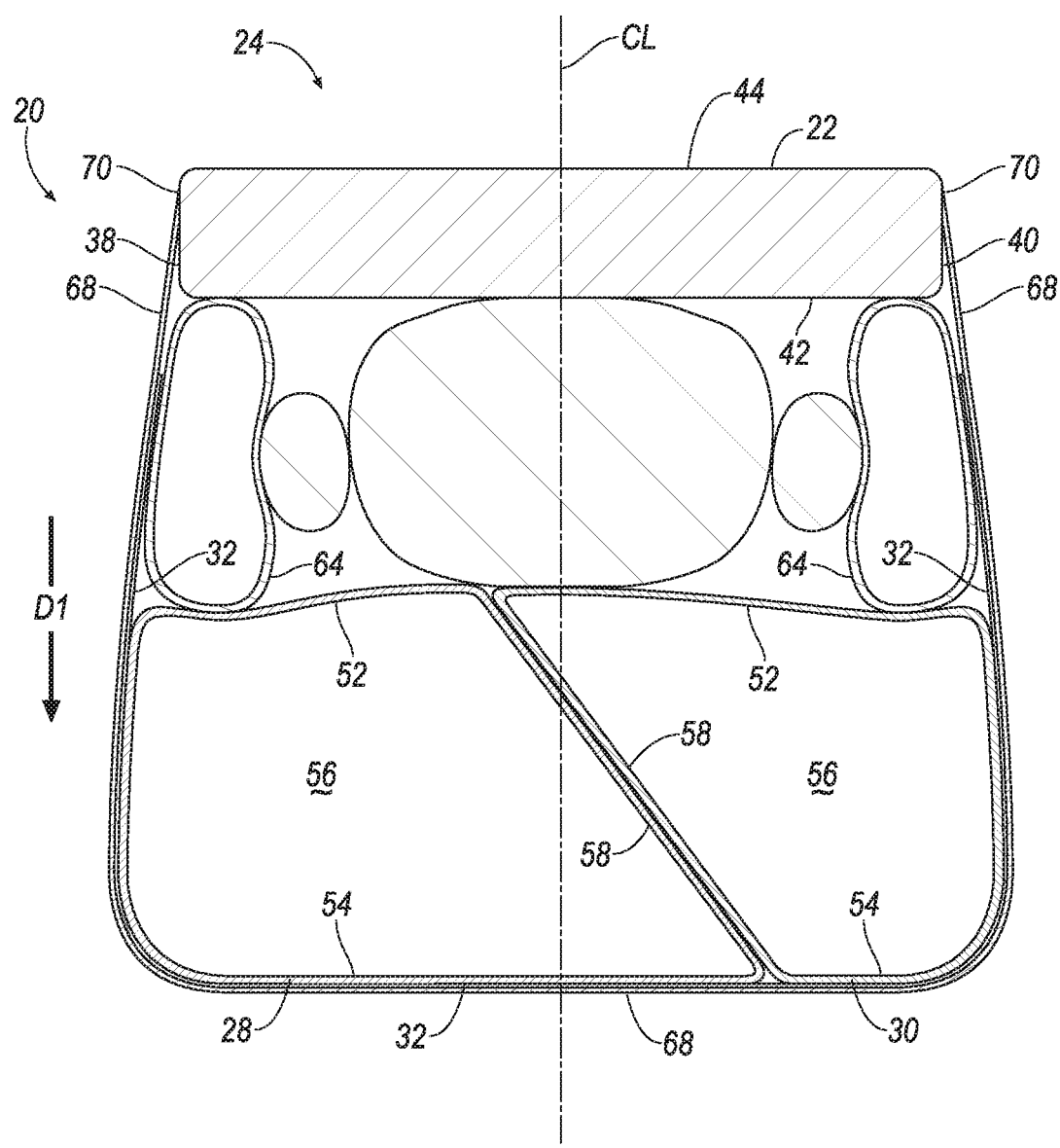
FIG. 5 is a top view cross section of FIG. 2 along the line 4-4.

The front portions 62 may be thicker than the top portions 60. For example, a distance D2 between the inner panel 52 and the outer panel 54 at the front portion 62 may be greater than a distance D3 between the inner panel 52 and the outer panel 54 at the top portion 60, as shown in FIG. 4.

The airbag assembly 20 may include one or more side airbags 64. The side airbags 64 control lateral kinematics of the occupant relative to the seat 24 during a vehicle impact. Each side airbag 64 may be supported by the seatback 22, e.g., one side airbag 64 may be supported at the first side 38 of the seatback 22 and another side airbag 64 may be supported at the second side 40 of the seatback 22. Each side airbag 64 is inflatable to an inflated position. One side airbag 64 in the inflated position may be between the seatback 22 and the first airbag 28 in the inflated position, e.g., between the first side 38 of the seatback 22 and the front portion 62 of the first airbag 28 in the inflated position. Another side airbag 64 in the inflated position may be between the seatback 22 and the second airbag 30 in the inflated position, e.g., between the second side 40 of the seatback 22 and the front portion 62 of the second airbag 30 in the inflated position.

Each airbag 28, 30, 64 may be formed of a woven polymer or any other material. As one example, the airbags may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The sheet 32 maintains the position and orientation of the first airbag 28 and the second airbag 30 in the inflated positions. The sheet 32 may be uninflatable. In other words, the sheet 32 may not define an inflation chamber, e.g., the sheet 32 may be a panel of material that is not fixed to another panel, or itself, to encloses a volume for receiving inflation medium. The sheet 32 may be a woven fabric, or any other suitable material. For example, the first airbag 28 and the sheet 32 may be a same type of material.

The sheet 32 extends from the first airbag 28 to the second airbag 30 in front of where the first airbag 28 abuts the second airbag 30 in the inflated positions. The sheet 32 may extend along the top portions 60 and the front portions 62 of the first airbag 28 and the second airbag 30. In other words, the sheet 32 may extend along the first airbag 28 and the second airbag 30 in front and above the first airbag 28 and the second airbag 30 in the inflated positions. For example, the sheet 32 may abut the outer panels 54 of the first airbag 28 and the second airbag 30 in the inflated positions with the first airbag 28 and the second airbag 30 between the sheet 32 and the seatback 22. The sheet 32 may abut the first airbag 28 and the second airbag 30 in the inflated positions with the first airbag 28 and the second airbag 30 between the sheet 32 and the seat bottom 46. The sheet 32 may extend away from one of the front portions 62 and toward the seatback 22. In other words, the sheet 32 may extend from in front and/or above the first airbag 28 and the second airbag 30 in the inflated positions toward the seatback 22 and beyond the inner panels 52.

The sheet 32 may define an opening 66. The opening 66 permits movement of the occupant toward the first airbag 28 and the second airbag 30 in the inflated positions during a vehicle impact. For example, the opening 66 inhibits a head of the occupant from contacting the sheet 32 during a vehicle impact. The opening 66 may be between the first airbag 28 and the second airbag 30 in the inflated positions. The opening 66 may be in front of and above the seatback 22. For example, the opening 66 may be between the top portions 60 of the first airbag 28 and the second airbag 30. As a continued example, the opening 66 may be between the seatback 22 and the front portions 62 of the first airbag 28 and the second airbag 30 in the inflated positions.

The airbag assembly 20 may include one or more tethers 68, 69. The tethers 68, 69 may be fixed to the seatback 22, e.g., the housing 50 supported by the seatback 22, to a frame of the seatback 22 with a fastener, bracket, etc. The tethers 68, 69 extend to the sheet 32. The tethers 68, 69 may be fixed to the sheet 32, e.g., via stitching, friction welding, adhesive, etc. The sheet 32 and one or more of the tethers 68, 69 may be monolithic. The tethers 68, 69 may be free of being directly fixed to the first airbag 28. The tethers 68, 69 may be free of being fixed to the second airbag 30. In other words, the tethers 68, 69 may not be stitched, friction welded, adhered, etc., directly to the first airbag 28 or the second airbag 30. One of the tethers 68 may be below another of the tethers 68. In other words, one of the tethers 68 may be between the seat bottom 46 and another of the tethers 68. The tethers 68 may extend from the first side 38 of the seatback 22 along the sheet 32 to the second side 40 of the seatback 22. In other words, the tethers 68 may each include opposing ends 70. The ends 70 may be fixed to opposite sides 38, 40 of the seatback 22. The tethers 68 may be fixed to the sheet 32 between the ends 70. The tethers 69, shown in FIG. 3, may be extend from a rear edge of the sheet 32 to the seatback 22. For example, the tethers 69 may be fixed to the housing 50, the frame of the seatback 22, etc.

The vehicle 26 and/or airbag assembly 20 may include one or more inflators 72 for inflating the airbags 28, 30, 64 to the inflated positions. The inflators 72 provides inflation medium to inflate the airbags 28, 30, 64 from the uninflated position to the inflated position. Each inflator 72 may be, for example, a pyrotechnic inflator that uses a chemical reaction to drive inflation medium to the airbag. The inflators 72 may be of any suitable type, for example, a cold-gas inflator.

One inflator 72 may in fluid communication with both the first airbag 28 and the second airbag 30, e.g., directly, through various piping, etc. For example, one inflator 72 may provide inflation medium to the first airbag 28 and the second airbag 30. As another example, one inflator 72 may only provide inflation medium to the first airbag 28, and another inflator 72 may provide inflation medium to the second airbag 30. Additional inflators 72 may provide inflation medium to the side airbags 64. The inflators 72 may be supported by the housing 50, the seat 24, or by any other suitable location of the vehicle 26.

The airbag assembly 20 may include one or more housings 50. The housings 50 provide reaction surfaces for the airbags 28, 30, 64 in the inflated positions. The housings 50 may be supported by the seatback 22. The housings 50 may be any material, e.g., a rigid polymer, a metal, a composite, etc. Although the first and the second airbags 28, 30 are shown supported by one housing 50, it is to be understood that multiple housings 50 may support the first and the second airbags 28, 30, e.g., the first airbags 28 may be supported by one housing 50, and the second airbag 30 be supported by another housing 50.

Figure 6:
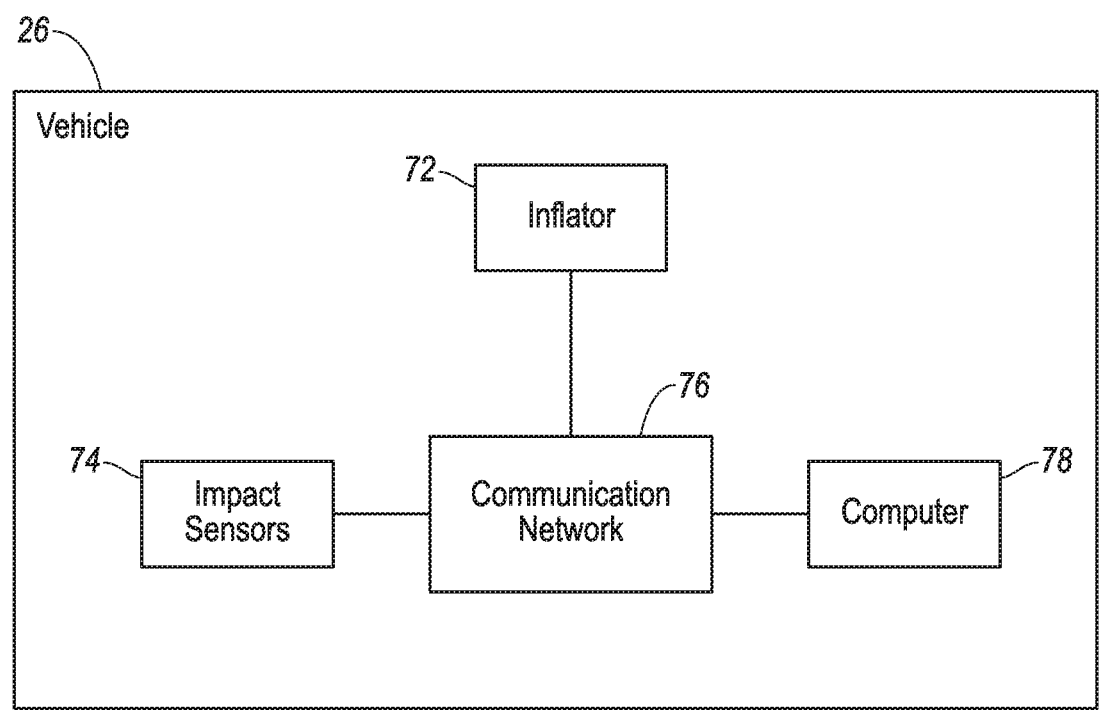
FIG. 6 is a block diagram showing components of the vehicle.

With reference to FIG. 6, the vehicle 26 may include at least one impact sensor 74 for sensing impact of the vehicle 26. The impact sensor 74 may be in communication with the computer 78. The impact sensor 74 is configured to detect an impact to the vehicle 26. Alternatively or additionally to sensing impact, the impact sensor 74 may be configured to sense impact prior to impact, i.e., pre-impact sensing. The impact sensor 74 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 74 may be located at numerous points in or on the vehicle 26.

The vehicle 26 may include a communication network 76. The communication network 76 includes hardware, such as a communication bus, for facilitating communication among vehicle components, e.g., a computer 78, the impact sensor 74, the inflators 72, etc. The communication network 76 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 78 may be a microprocessor based computer implemented via circuits, chips, or other electronic components. For example, the computer 78 may include a processor, a memory, etc. The memory of the computer 78 may store instructions executable by the processor as well as electronically storing data and/or databases.

The computer 78 may be programmed to inflate the airbags 28, 30, 64, e.g., in response to an impact detected with the impact sensor 74. The airbags 28, 30, 64 may be inflated at a same time, or sequentially. For example, the computer 78 may receive information from the impact sensor 74 via the communication network 76 indicating a vehicle impact has been detected. In response, the computer 78 may first instruct actuation of one or more inflators 72 via the communication network 76 to inflate the first airbag 28 and the second airbag 30. Next, the computer 78 may instruct actuation of one or more inflators 72 via the communication network 76 to inflate the side airbags 64.

As the top portions 60 of the first airbag 28 and the second airbag 30 inflate, the first and second airbags 28, 30 and the sheet 32 are carried over top of the occupant of the seat 24. The sheet 32 directs inflation of the front portions 62 of the first airbag 28 and the second airbag 30, with the tethers 68 positioning the sheet 32 relative to the seat 24. The side airbags 64 then inflate, and are maintained in positions by the tethers 68, sheet 32, and the inflated first airbag 28 and second airbag 30. The first airbag 28, second airbag 30, and side airbags 64 in the inflated position control kinematics of the occupant of the seat 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seatback;
   a first airbag and a second airbag, each supported within the seatback and inflatable to an inflated position spaced from each other at the seatback and abutting each other in front of and spaced from the seatback, the first airbag and the second airbag in the inflated positions each including a top portion and a front portion, the top portions extending arcuately from the seatback to the front portions and spaced from each other, the front portions extending toward and abutting each other; and
   a sheet within the seatback prior to inflation of the first airbag and the second airbag, the sheet extending from the first airbag to the second airbag in front of where the first airbag abuts the second airbag in the inflated positions, and the sheet extending away from one of the front portions and toward the seatback.

2. The assembly of claim 1, wherein the first airbag is in front of the second airbag where the first airbag abuts the second airbag in the inflated positions.

3. The assembly of claim 1, wherein the seatback has a top, and the first airbag and the second airbag are supported at the top of the seatback.

4. The assembly of claim 1, wherein the first airbag and the second airbag abut each other at a centerline defined by the seatback.

5. The assembly of claim 1, wherein the front portions are thicker than the top portions.

6. The assembly of claim 1, wherein the sheet extends along the top portions and the front portions of the first airbag and the second airbag.

7. The assembly of claim 1, further comprising a side airbag supported by the seatback and inflatable to an inflated position between the seatback and the first airbag in the inflated position.

8. The assembly of claim 7, further comprising a processor and a memory storing instructions executable by the processor to inflate the first airbag, and then inflate the side airbag.

9. The assembly of claim 1, wherein the first airbag and the sheet are a same type of material.

10. The assembly of claim 1, wherein the sheet is uninflatable.

11. The assembly of claim 1, further comprising an inflator in fluid communication with the first airbag and the second airbag.

12. An assembly, comprising:
    a seatback;
    a first airbag and a second airbag, each inflatable to an inflated position spaced from each other at the seatback and abutting each other in front of and spaced from the seatback;
    a sheet extending from the first airbag to the second airbag in front of where the first airbag abuts the second airbag in the inflated positions; and
    a tether fixed to the seatback and extending to the sheet.

13. The assembly of claim 12, further comprising a second tether fixed to the seatback and extending to the sheet, the second tether below the tether.

14. The assembly of claim 12, wherein the tether is fixed to the sheet.

15. The assembly of claim 12, wherein the tether is free of being directly fixed to the first airbag and is free of being fixed to the second airbag.

16. The assembly of claim 12, wherein the seatback includes a first side and a second side opposite the first side, the tether extending from the first side of the seatback along the sheet to the second side of the seatback.

17. An assembly, comprising:
    a seatback;
    a first airbag and a second airbag, each inflatable to an inflated position spaced from each other at the seatback and abutting each other in front of and spaced from the seatback; and
    a sheet extending from the first airbag to the second airbag in front of where the first airbag abuts the second airbag in the inflated positions, the sheet defining an opening between the first airbag and the second airbag in the inflated positions.

18. The assembly of claim 17, wherein the opening is in front of and above the seatback.

* * * * *